United States Patent
Pfutzenreuter et al.

(10) Patent No.: US 6,942,146 B2
(45) Date of Patent: Sep. 13, 2005

(54) SYSTEM AND METHOD FOR BIN MANAGEMENT

(75) Inventors: Rachel H. Pfutzenreuter, Deerfield, IL (US); Dejan Kozic, Wadsworth, IL (US); Charles L. Goodall, Hawthorn Woods, IL (US); Rong Huang, Buffalo Grove, IL (US)

(73) Assignee: Walgreen Company, Deerfield, IL (US)

( * ) Notice: Subject to any disclaimer, the term of this patent is extended or adjusted under 35 U.S.C. 154(b) by 342 days.

(21) Appl. No.: 10/061,730

(22) Filed: Feb. 1, 2002

(65) Prior Publication Data

US 2003/0146274 A1 Aug. 7, 2003

(51) Int. Cl.[7] .......................... G06F 17/60; G06F 17/00
(52) U.S. Cl. .......................... 235/385; 235/375; 705/28
(58) Field of Search ................................ 235/375, 385; 705/3, 28, 29; 700/213–216, 223–225, 231, 237, 241, 244; 382/306

(56) References Cited

U.S. PATENT DOCUMENTS

| | | | | |
|---|---|---|---|---|
| 4,163,497 A | | 8/1979 | McEwen ........................ 211/11 |
| 4,212,506 A | | 7/1980 | Merl ........................... 312/118 |
| 4,540,222 A | | 9/1985 | Burrell ...................... 312/257 R |
| 4,636,634 A | * | 1/1987 | Harper et al. ............ 250/223 R |
| 4,735,324 A | | 4/1988 | Wilcek ........................ 211/184 |
| 4,844,266 A | | 7/1989 | Small et al. .................... 211/88 |
| 5,597,995 A | * | 1/1997 | Williams et al. ............ 235/375 |
| 5,905,653 A | * | 5/1999 | Higham et al. ............. 700/244 |
| 5,946,660 A | * | 8/1999 | McCarty et al. ................ 705/5 |
| 6,044,989 A | | 4/2000 | Sosso .......................... 211/189 |
| 6,147,686 A | | 11/2000 | Brown et al. ................ 345/349 |
| 6,464,142 B1 | * | 10/2002 | Denenberg et al. ..... 235/462.46 |
| 6,690,997 B2 | * | 2/2004 | Rivalto ........................ 700/237 |
| 6,694,217 B2 | * | 2/2004 | Bloom ........................ 700/215 |
| 2003/0105552 A1 | * | 6/2003 | Lunak et al. ................ 700/214 |

\* cited by examiner

*Primary Examiner*—Daniel Stcyr
*Assistant Examiner*—April Taylor
(74) *Attorney, Agent, or Firm*—Marshall, Gerstein & Borun LLP

(57) ABSTRACT

A system for bin management includes an input of bin quantity, a database of customer-specific data, and a controller. The controller is operatively connected to the database and arranged to obtain the customer-specific data and the input of bin quantity, to use the customer specific data and the input of bin quantity to determine a segmentation of a multiplicity of bins, to create a representation identifying the segmentation of the multiplicity of bins and has a memory for storing the representation. The system additionally has an output of the representation which identifies the segmentation of the multiplicity of bins. Processes for calculating the segmentation of the multiplicity of bins and for storing and retrieving items based on segmentation data are also provided.

30 Claims, 4 Drawing Sheets

SYSTEM AND METHOD FOR BIN MANAGEMENT

FIELD OF THE DISCLOSURE

The invention relates generally to bin management and, more specifically, to a system and method for bin management to assist with the storage and retrieval of customer-specific items.

BACKGROUND OF THE DISCLOSURE

Presently, pharmacies perform a number of different customer-specific services that may require storing and retrieval of specific customer-requested items. For example, pharmacies store and retrieve prescription containers and processed films for their customers.

While the pharmacies assist their customers with various personalized services, filling prescriptions remains a primary customer-specific service for the pharmacies. In particular, the pharmacies fill, stock and then retrieve prescription containers for their customers. Often, a pharmacy may have dozens and possibly hundreds of prescription containers stored in bins or depositories awaiting pick up by customers. Because of the multitude of prescription containers that are frequently stored at a single pharmacy location, pharmacies typically have difficulty storing and retrieving these containers easily and efficiently.

The prescription containers may be difficult to quickly retrieve because the prescription containers can be inadvertently placed in the wrong storage bin. Additionally, if a prescription container is misplaced and cannot be found, a pharmacist must refill the prescription, causing a delay in delivery to the customer. When the containers are lost, the pharmacy incurs additional costs to refill the prescription. In addition, the delay in delivering the prescription to the customer may negatively impact on customer relations. Therefore, misplaced and/or lost prescription containers are time consuming for the pharmacist technician and the customer, are costly for the pharmacy and detrimentally effect customer service and good will.

Additionally, current methods of prescription storage adversely affect the efficiency of the pharmacies. Many of the current methods of prescription storage are based on an alphabetical organizational system that, according to studies, is more difficult to utilize than a counterpart numerical based system. These studies have shown that people take longer to store and retrieve articles that have been organized alphabetically rather than numerically.

For these reasons, the current methods of alphabetically based prescription storage are not desirable. For example, most pharmacies stock and store prescriptions according to the last name of the customer. Thus, to stock and then retrieve the prescription from the bin in which it is stored, the pharmacist technician must search through the bins according to the alphabetical designations on the bin containers. Because, as discussed above, an alphabetical based system is intuitively more difficult, the pharmacist technician will often spend more time stocking and/or retrieving prescriptions.

Further, because the prescription containers are commonly put away according to an alphabetical designation associated with the name of the customer, some bins are overstocked while others are understocked. For example, because there may be many customers having last names beginning with letters such as, for example, "S" for Smith or "J" for Jones, the bins storing prescriptions for these letters may overflow with prescription containers. Similarly, because there may be very few customers having last names beginning with letters such as, for example, "X," "Y" or "Z," these bins may be relatively empty. For these reasons, the current methods of bin management result in bins that are mismanaged and disorganized.

Thus, there is a need for an alphanumerical based system and method for bin management to more accurately and efficiently store and retrieve filled prescription containers. Such a system and method will more evenly disperse the prescription containers throughout the available bins, save money typically lost on misplaced prescriptions and improve customer relations.

Figure 1:
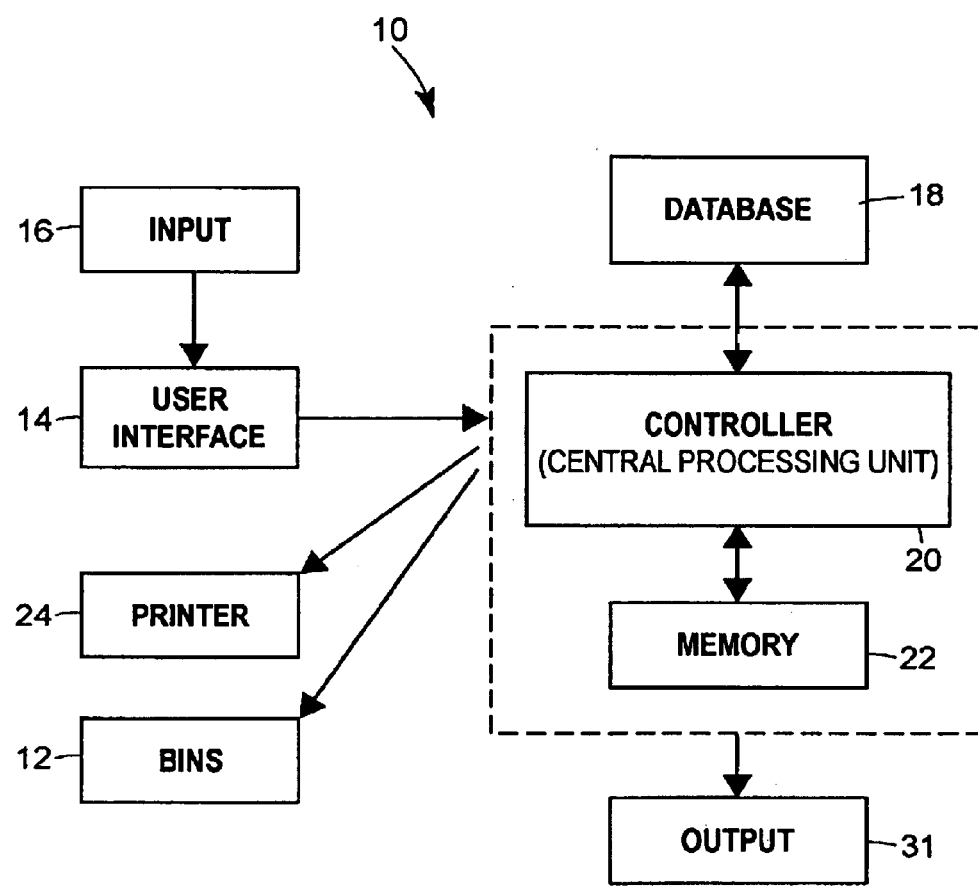
FIG. 1 is a block diagram representation of a bin management system that may be adapted in accordance with the present disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

DETAILED DESCRIPTION OF THE PREFERRED EMBODIMENTS

The term "pharmacist" as used herein refers to a pharmacist or other employee, such as a pharmacy technician, of a selected pharmacy location who is authorized to stock and retrieve filled prescriptions for customers or customers of the pharmacy.

Referring now to the drawings, and with specific reference to FIG. 1, a bin management system 10 for segmenting a plurality of bins 12 is shown. The system 10 includes a user interface 14 including a bin quantity input 16. The system 10 also includes a database 18 including customer-specific data (not shown). The system 10 also includes a central processing unit ("cpu") or controller 20 to determine the segmentation of the bins 12 and create segmentation data as will be discussed in more detail below. A memory 22 is operatively coupled to the controller 20 to store the segmentation data generated after the segmentation of the bins 12. While the controller 20 and the memory 22 are illustrated as two separate elements of the system 10, a dashed line is illustrated around the controller 20 and the memory 22 to show that they may be both be embodied in a single element of the system. Additionally, an embodiment of the system 10 may include a printer 24.

The database 18 of customer-specific data includes a list of customer names for one specific selected store location. In particular, the list of names may include each customer's last name. Segmentation of the bins 12 will be based on the entire list of customer names for the selected store in the database 18 unless a query of customers is created to generate a subset of customers having specific information in addition to the customers name, such as, a customer activity update. The activity update represents the prescription activity for each customer including, but not limited to, the dates on which the customer has ordered and obtained a prescription from the pharmacy. Additionally, the activity update for each customer may be categorized in the database 18 according to selected time frames. For example, a user can select only customers who have had prescription activity within the previous six months or customers who have had prescription activity within the previous year. The ability to isolate a certain body of customers in the database 18 who have had prescription activity within a selected time frame is advantageous because the controller 20 can determine the segmentation of the bins 12 for only those customers who have obtained prescriptions from the pharmacy within the selected time frame. Segmentation of the bins using only a selected subset of customers may be more accurate because it eliminates customers in the database 18 who no longer, or have not within the selected time frame, interacted with the pharmacy to utilize the pharmacy's customer-specific services. Additionally, segmentation of the bins based on a selected subset of customers may also result in a better dispersal of prescription containers among the bins as well as faster and more accurate stocking and retrieval of prescription containers. In alternate embodiments of the system 10, another selected time frame may be chosen.

In another embodiment of the system 10, the database 18 may also include customer names for several store locations. In yet another embodiment of the system 10, the database 18 may include customer names for a geographical area rather than a specific store location.

The input of bin quantity 16 is the total number of bins 12 used to store customer-specific items at a selected pharmacy. Specifically, with respect to prescriptions, the input of bin quantity 16 is the number of prescription storage bins. The input of bin quantity 16 for a store location is, preferably, no less than a minimum number of twenty (20) bins and is, preferably, no greater than a maximum number of two hundred (200) bins. A user, typically a pharmacist, enters the input of bin quantity 16 via the user interface 14 into the system 10 to generate the segmentation of the bins 12. This segmentation of the bins, as discussed below, creates identification data (generally see FIG. 2), including alphabetical letter combinations and ranges, for each bin. This identification data may be stored in the memory 22 for retrieval by the user.

The controller 20 is arranged to receive the input of bin quantity 16 and the customer-specific data in the database 18 and to use the input of bin quantity 16 and the customer-specific data in the database 18 to determine the segmentation of a multiplicity of bins 12 in a pharmacy. Then, the controller 20 uses the segmentation of the bins to create a representation 30 as shown, for example, in FIG. 2, which identifies the segmentation of the bins 12. The representation 30 is then sent by the controller 20 as an output 31 which may be viewed by the user.

The output 31 may be viewed in hard copy form by the user by printing the representation 30 of the segmentation on the printer 24 which may be attached to the system 10. Or, the output may simply be viewed by the user by displaying the representation 30 on a display monitor 32 as shown in FIG. 2.

Figure 2:
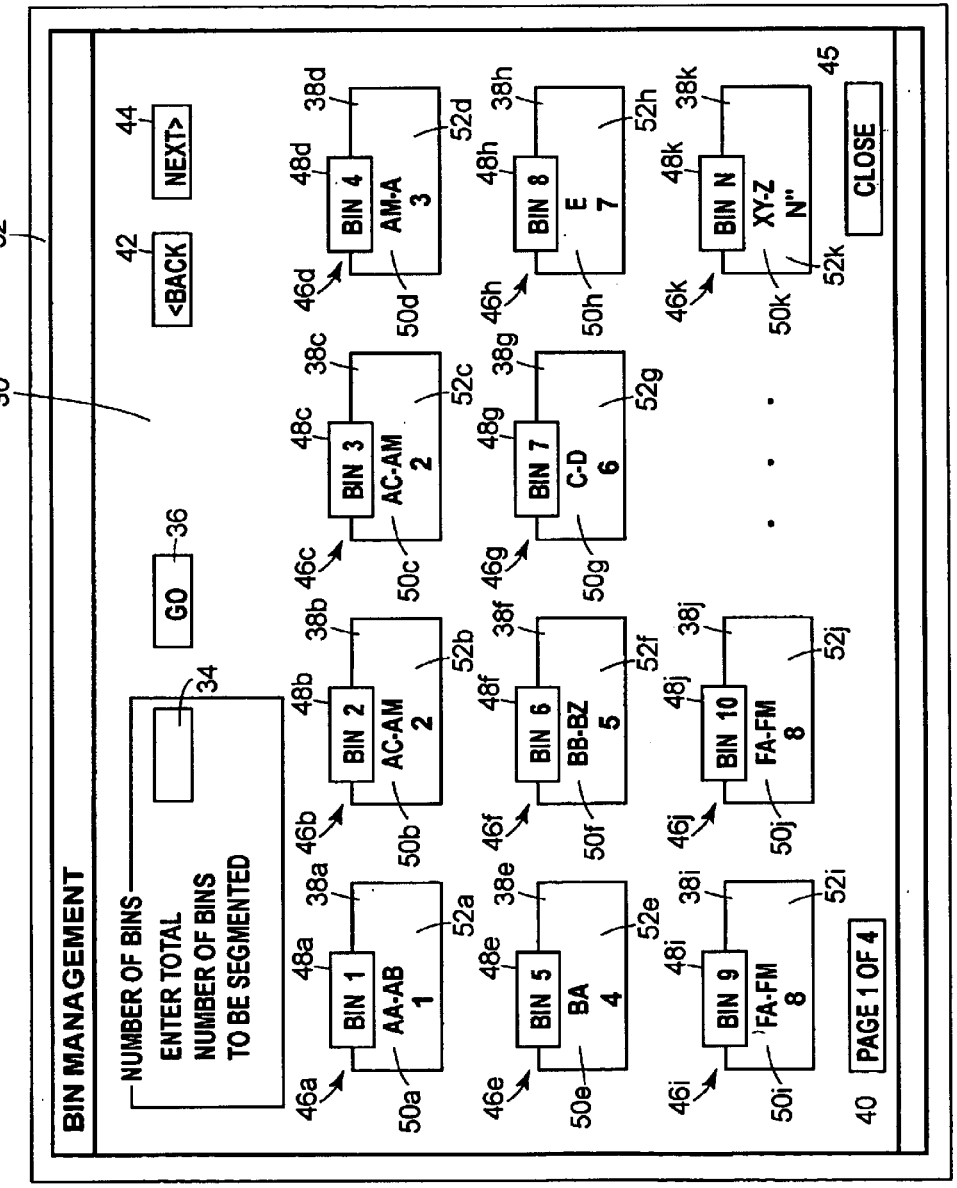
FIG. 2 is a view of a display unit in accordance with the present disclosure.

Referring now to FIG. 2, a display monitor 32 is shown including an embodiment of the representation 30 of the segmentation of the bins 12 determined by the system 10. As discussed above, a user may enter the input of bin quantity in a block 34. The user enters the input of bin quantity 16 via the user interface 14 of system 10 which is typically a keyboard (not shown). The user may then select a block 36 using the user interface 14 or some other device (not shown), as is known by those skilled in the art, to start the determination of the segmentation of the bins 12 by the controller 20. Next, the controller 20 calculates the segmentation of the bins 12. After calculation of the segmentation of the bins 12, the controller 20 creates the output 31 of the calculated segmentation which may be displayed as the representation 30 of the segmentation on the display monitor 32 as shown in FIG. 2.

The representation 30 includes number of blocks 38*a*, 38*b*, 38*c*, 38*d*, 38*e*, 38*f*, 38*g*, 38*h*, 38*i*, 38*j* and 38*k* which represent each bin of the multiplicity of bins 12 for the selected location after calculation of the segmentation of the bins 12. Because there may be as many as two hundred bins 12, the representation 30 may be too large to fit on a single display screen or page. Thus, it may be necessary for the representation 30 to span more than one page. The number of pages is indicated at the bottom left-hand corner of the representation 30 in a block 40. Further, if an embodiment of the representation has more than one page as depicted in FIG. 2, the user can flip between pages of the representation by selecting a block 42 which is labeled "Back" and allows the user to view the previous page, if there is a previous page, and by selecting a block 44 which is labeled "Next" and allows the user to view the next page, if there is a next page. If the user wishes to have a hard copy of each page, the pages of the representation 30 may be printed on printer 24. Additionally, if the user is finished viewing the segmentation of the bins and wants to close the bin management window illustrating representation 30, the user must select a block 45 which is labeled "Close."

Each of the blocks 38*a*, 38*b*, 38*c*, 38*d*, 38*e*, 38*f*, 38*g*, 38*h*, 38*i*, 38*j* and 38*k* includes an alphanumeric designation, also referred to as segmentation data, 46*a*, 46*b*, 46*c*, 46*d*, 46*e*, 46*f*, 46*g*, 46*h*, 46*i*, 46*j* and 46*k*, respectively. The alphanumeric designations 46*a*, 46*b*, 46*c*, 46*d*, 46*e*, 46*f*, 46*g*, 46*h*, 46*i*, 46*j* and 46*k* are associated with the customer-specific data in the database 18. Each alphanumeric designation 46*a*, 46*b*, 46*c*, 46*d*, 46*e*, 46*f*, 46*g*, 46*h*, 46*i*, 46*j* and 46*k* further includes a bin count designation 48*a*, 48*b*, 48*c*, 48*d*, 48*e*, 48*f*, 48*g*, 48*h*, 48*i*, 48*j* and 48*k*, respectively, an alphabetical designation 50*a*, 50*b*, 50*c*, 50*d*, 50*e*, 50*f*, 50*g*, 50*h*, 50*i*, 50*j* and 50*k*, respectively, and a bin number 52*a*, 52*b*, 52*c*, 52*d*, 52*e*, 52*f*, 52*g*, 52*h*, 52*i*, 52*j* and 52*k*, respectively. The bin count designations 48*a*, 48*b*, 48*c*, 48*d*, 48*e*, 48*f*, 48*g*, 48*h*, 48*i*, 48*j* and 48*k* represent the physical number of bins 12, numbers 1–N', at the specific selected location. The alphabetical designations 50*a*, 50*b*, 50*c*, 50*d*, 50*e*, 50*f*, 50*g*, 50*h*, 50*i*, 50*j* and 50*k* include a letter or letter combination representing the customers having last names beginning with the letter or letter combination assigned to the bins 12 and allow each bin to be identified by an alpha label. The bin numbers 52*a*, 52*b*, 52*c*, 52*d*, 52*e*, 52*f*, 52*g*, 52*h*, 52*i*, 52*j* and 52*k* are numerical designations, numbers 1–N" which are associated with the alphabetical designations 50*a*, 50*b*, 50*c*, 50*d*, 50*e*, 50*f*, 50*g*, 50*h*, 50*i*, 50*j* and 50*k* and allow each bin to be identified by a number label. This method of bin management facilitates the stocking and retrieval of prescription containers because the containers may be identified by either an alpha designation or a numerical designation which makes the process faster and, thereby, improves customer relations.

As discussed, the alphabetical designations 50a, 50b, 50c, 50d, 50e, 50f, 50g, 50h, 50i, 50j and 50k represent the first letter or letters in a customer's last name and allow prescription containers (not shown) to be stocked and retrieved according to each container's alphabetical designation. The alphabetical designations 50a, 50b, 50c, 50d, 50e, 50f, 50g, 50h, 50i, 50j and 50k for the bins 12 are determined by the controller 20 while it calculates the segmentation of the bins 12. The alphabetical designation may have only a single letter as is illustrated by alphabetical designation 50h. Additionally, the alphabetical designation may be a two-letter substring combination as is illustrated by alphabetical designation 50e. Further, the alphabetical designation may be a range delineated by two letters as depicted by 50g, a range delineated by a two-letter substring and a single letter as depicted by 50d and 50k or a range delineated by two, two-letter substrings as depicted by 50a, 50b, 50c, 50f, 50i and 50j. If the alphabetical designation is a range, then it is understood that all letters or letter combinations which fall between the range indicated are stored in that bin. For example, in the embodiment illustrated in FIG. 2, a customer last name beginning with the combination "BO" is found in the bin 12 assigned the alphabetical designation 50f, identified by the range "BB–BZ" and assigned the bin number "5" 52f.

In general, each unique alphabetical designation is associated with a bin number. Sometimes there are so many customers associated with an alphabetical designation that the controller may allot two bins to store the prescriptions assigned that alphabetical designation. As shown in FIG. 2, if the same alphabetical designation 50i and 50j is assigned to two bin counts 48i and 48j, then the same bin number 52i and 52j is assigned to the bin counts 48i and 48j. For example, a customer last name beginning with the combination "FI" is found in one of the two bins 12 identified by the alphabetical designation range "FA–FM," 50i and 50j, and identified by the bin number "8," 52i and 52j. (See also, bin counts 48b and 48c, alphabetical designations 50b and 50c and bin numbers 52b and 52c.)

In another embodiment of the representation 30, two bins may have the same bin number but a different alphabetical designation. For example, a first bin (not shown) may have a bin number "X" and an alphabetical designation having a range "GE–GO", and a second bin (not shown) may have the same bin number "X" but a different alphabetical designation having a letter combination "GO." There may be at least two explanations for these alphabetical designations. First, there may be no customers in a range "GE–GN" but many customers having a last name beginning with "GO." Thus, the first bin alphabetical designation "GE–GO" could accurately be described as only "GO" but is labeled with the range which serves as a placeholder for names having "GE–GN" and ensures that there are not any gaps in the alphabetical designations for the bins. Second, there may be a few customers having names in the range of "GE–GN" but a large number of customers having names beginning with the combination "GO." Because there are so many customers having names beginning with "GO," the prescription containers labeled with the alphabetical designation "GO" must be allocated two bins.

Further, as illustrated, the alphabetical designations generated during segmentation of the bins are not restricted to a single letter assigned to a single bin. Rather, there are a combination of many different alphabetical designations, some of which may be illogical, to ensure that the prescription containers are evenly dispersed throughout the entirety of bins present at the specific, selected location. The alphabetical designation may be a range of two-letter substrings that are comprised of a vowel-vowel combination, a consonant-consonant combination or any other combination that is not completely logical. In the embodiment of the disclosure shown in FIG. 2, the alphabetical designations 50a, 50b, 50c, 50d, 50e, 50f, 50g, 50h, 50i, 50j and 50k which include substrings have, at most, only two letter substring combinations. In alternate embodiments, the alphabetical designations could include substring combinations which have more than two letters.

Figure 3:
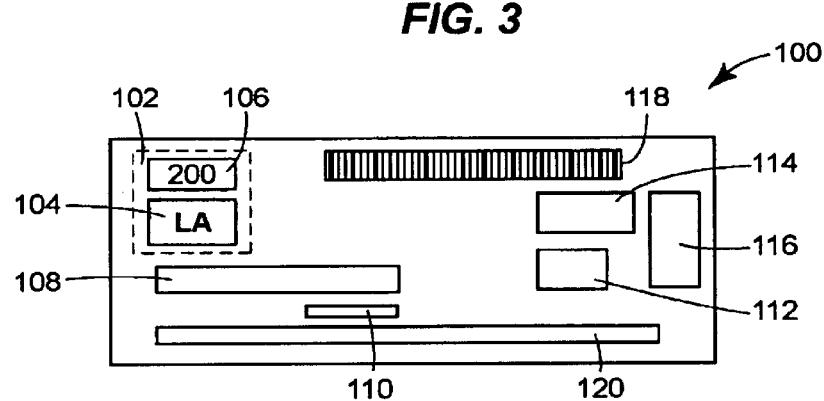
FIG. 3 is a view of a pharmacy label in accordance with the present disclosure.

As shown in FIG. 3, a pharmacy prescription label 100 may be printed and attached to a prescription container (not shown). The pharmacy prescription label 100 may contain identification data 102. as represented by a phantom block, that includes an alphabetical designation 104 and a bin number 106. The identification data 102 assists the pharmacist to quickly stock the prescription container as well as quickly retrieve the container when the customer arrives at the pharmacy to pick-up the prescription container. The pharmacy prescription label 100 may also have general customer information such as, for example, an address represented by a block 108 and a phone number represented by a block 110. The pharmacy prescription label 100 may also include information about the prescription such as a date that the prescription was filled represented by a block 112, a price for the prescription represented by a block 114, instructions to the pharmacist regarding pick-up represented by a block 116, a bar code identifier 118 and instructions to the customer regarding the medication represented by a block 120. The pharmacy prescription label 100 may be a peel-off label which is disposed on a removable backing (not shown). Additionally, the pharmacy prescription label may be available as an individual peel-off label or may be available on sheets having multiple peel-off labels. Further, the pharmacy prescription label 100 may, in an embodiment of system 10, be printed by printer 24.

Figure 4:
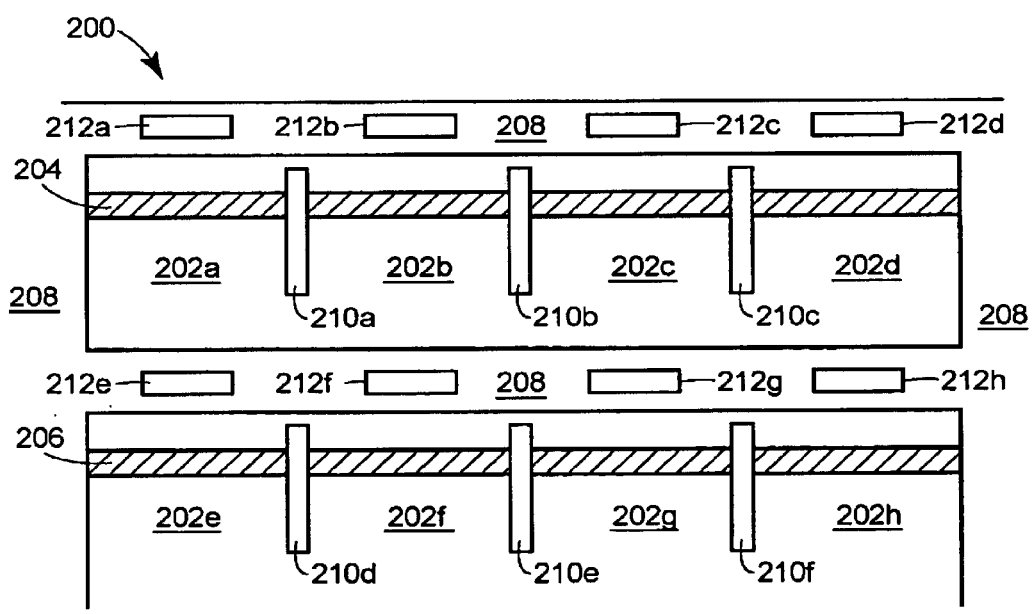
FIG. 4 is a representation of prescription bins in accordance with the present disclosure.

FIG. 4 shows one possible representation 200 of a plurality of bins 202 that may be created by system 10 of FIG. 1. The representation 200 illustrates eight bins 202a, 202b, 202c, 202d, 202e, 202f, 202g and 202h. In the embodiment shown in FIG. 4, each of the bins 202a, 202b, 202c, 202d, 202e, 202f, 202g and 202h stores prescription containers (not shown) via a hanging mechanism. A portion of a bar or rack-like structure 204 is disposed within each bin 202a, 202b, 202c and 202d. Similarly, a portion of a bar or rack-like structure 206 is disposed within each bin 202e, 202f, 202g and 202h. The prescription containers are hung on these rack-like structures 204, 206 until they are retrieved by a pharmacist. The bars 204 and 206 are secured in place by attachment to the wall structure 208 surrounding the representation 200. Each prescription container includes a hanging mechanism such as, a hook, or is stored in a container that has a hanging mechanism such as, a hook. The various hanging mechanisms, including but not limited to a hook, are used to hang the prescription containers on the rack-like structures 204, 206 as is known to those skilled in the art. As illustrated in FIG. 4, a plurality of dividers 210a, 210b, 210c, 210d, 210e and 210f separate the bins 202a, 202b, 202c, 202d, 202e, 202f, 202g and 202h. Each of the bins 202a, 202b, 202c, 202d, 202e, 202f, 202g and 202h includes a bin label 212a, 212b, 212c, 212d, 212e, 212f, 212g and 212h, respectively, that is temporarily affixed to the wall structure 208 and identifies each bin by its alpha-numerical designation (not shown) as determined during the segmentation of the bins 202a, 202b, 202c, 202d, 202e, 202f, 202g and 202h by the controller 20 of system 10. The bin labels are temporary because new labels having new alphanumerical designations must be assigned to the bins each time the bins are resegmented. Temporary bin labels may include labels, for example, that are made of an erasable ink-like composition so that the label designations may be erased or labels that are removably secured to the structure surrounding the bins so that the label may be removed each time the bins are resegmented. In one embodiment of the system 10, the bin labels may be printed by the printer 24. Alternatively, the bin labels may be handwritten or otherwise created to accurately and temporarily label the bins.

Further, in another embodiment of the system 10, the bin labels could be digital representations of the alphanumerical designations which appear on computer-like screens associated with each bin. The digital representations could be operatively connected to the controller and would be easily changeable each time the bins were resegmented. In yet another alternative embodiment of the bin management system, the bin labels or the bins may be operatively connected to a lighting system so that the bin or the bin label becomes illuminated to assist the pharmacist when locating and retrieving a prescription container.

Figure 5:
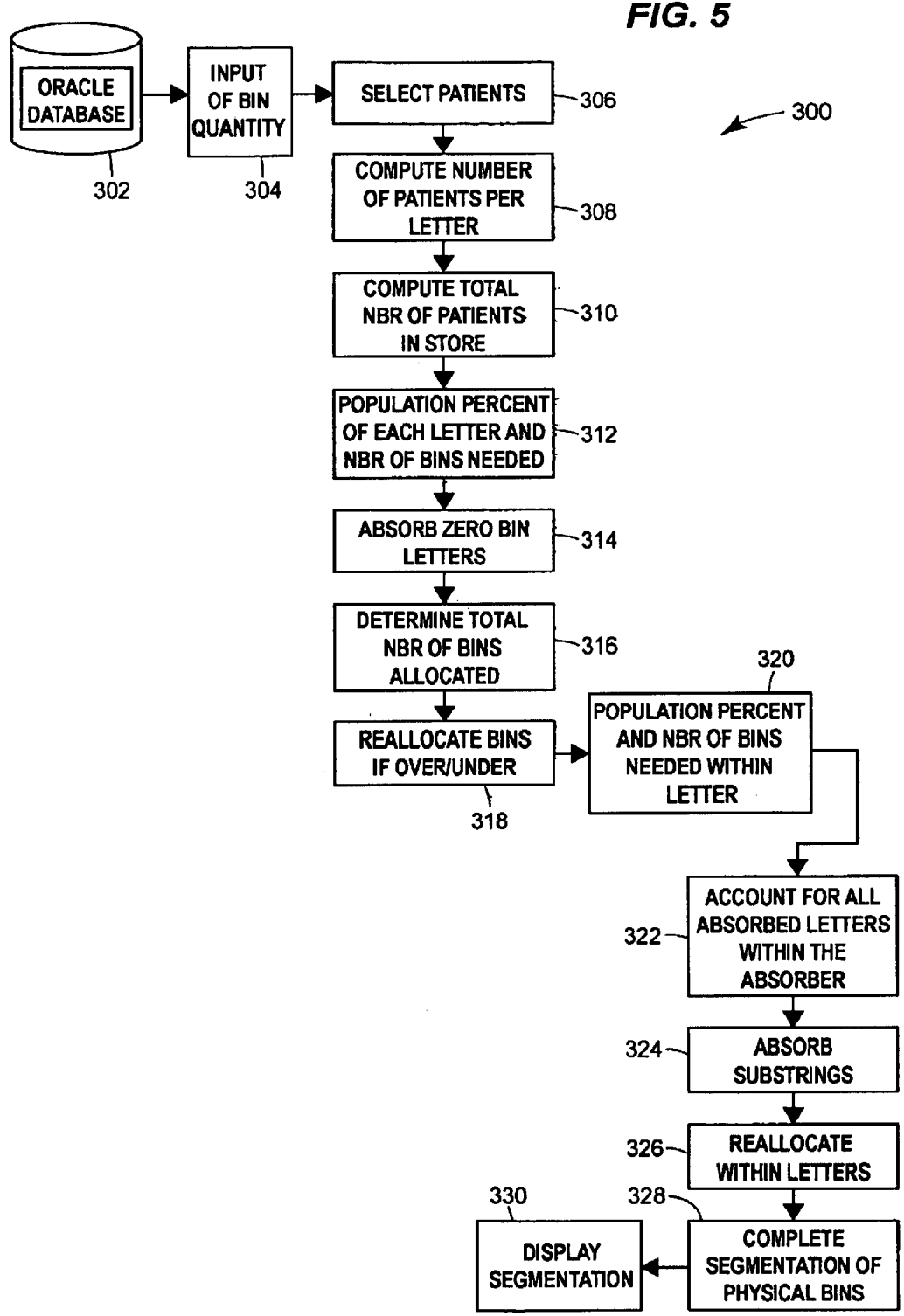
FIG. 5 is a flow diagram illustrating a method of segmenting the bins in accordance with the present disclosure.

A method 300 for segmenting the bins 12 of system 10 is shown in FIG. 5. As stated in steps 302, a database 18 of system 10 is provided. In step 304, a user (not shown) inputs a bin quantity representing the total number of bins available at a pharamacy. Then, in step 306, the user may select a subset of customer names from the database 18. The customer names are generally provided in association with a selected store location or a selected geographic location as discussed above. Once the user selects the subset of customers, the controller 20 determines the segmentation of the bins 12. In step 308, the controller 20 then determines, from the group of selected customers in step 306, the number of customers having a last name that begins with each letter of the alphabet, i.e. A–Z.

In step 310, the controller computes the total number of customers at the selected store. Then, as stated in step 312, the controller 20 determines the population percentage of customers for each letter of the alphabet as well as the number of bins needed for each letter of the alphabet. The population percentage for letter "A," for example, is determined by dividing the number of customers having last names beginning with "A" by the total number of customers selected in step 306. This process of determining population percentage is carried out for each letter of the alphabet. The number of bins allocated to each letter of the alphabet, as described in step 312, is determined by multiplying the population percentage for each letter by the total number of bins in the store (otherwise referred to as bin quantity) and then adding one half (0.5) to that multiplication result.

As stated in step 314, each letter of the alphabet that is allocated zero bins (i.e. requires less than one whole bin based on the number of customers having a last name beginning with that letter out of the total number of customer names selected) is absorbed into the front or back neighboring letter depending on which letter has fewer customer names. For example, if the customers having a last name beginning with a "B" did not fill up one whole bin and were therefore allocated "zero" bins, the "B" names would be absorbed into the neighboring letter, either the previous or front neighboring letter "A" or the next or back neighboring letter "C," depending on which neighboring letter has been allocated the fewest number of customer names.

Step 316 determines the total number of bins that have been allocated to the various letters of the alphabet. Then, as stated in step 318, the bins are reallocated if a comparison of the number of bins allocated and the total number of bins determines that the number of bins allocated is either greater than or less than the total number of bins available at the selected location. To properly reallocate the bins, a sort is conducted to identify the letter or letters having the smallest population percentage of those letters that have been allocated to at least one bin. The sort conducts a series of calculations for each letter in which one bin is subtracted from the number of bins allocated for each letter. If, after these calculations, the result is zero bins for a particular letter or letters, the letter having zero bins is absorbed into a neighboring letter by the same process as discussed above in connection with step 314.

Referring now to step 320, if a letter has been allocated more than one bin, a proper allocation of the bins assigned to that letter must be determined so that there is an even dispersal of customers allocated to each of the bins. The allocation of customers for a certain letter is determined by calculating the population percentage for each two-letter substring for the letter. For example, if the letter "A" has been allocated to more than one bin because of the larger number of customers having last names that begin with an "A," the controller 20 computes the number of customers having names that begin with the two-letter "A" substrings (AA, AB, AC, AD . . . AZ). Then the controller 20 determines the population percentage for each two-letter "A" substring. The population percentage is determined according to the process described in connection with step 312, except that the percentage is based on the total number customers having the last name beginning with "A."

Step 322 accounts for all absorbed letters. Letters or substrings that have been absorbed into a back neighboring letter or substring are placed into a back absorbed letters field. Letters or substrings that have been absorbed into a front neighboring letter are placed into a front absorbed letters field. These fields are created to assist the controller in accounting for absorbed letters or substrings when determining the segmentation of the bins. The controller acknowledges absorbed letters or substrings stored in these fields and ensures that no gaps in the alphabetical sequence appear in the alphabetical designations for each bin. If this system 10 did not account for absorbed letters or substrings, gaps may appear in the representation 30. For example, if letter "B" was absorbed into letter "C," and the system did not account for the absorbed letters, the representation may include consecutive bins labeled, for example, "AN–AZ" and "C." Thus, the representation would have a gap because it did not include or account for any existing or future customers having last names that begin with "B."

As described in step 324, substrings that were allocated zero bins in step 320 are absorbed into the front neighboring substring or the back neighboring substring depending on which of the front or back neighboring substring has fewer customer names.

In step 326, the allocation of bins for each substring within a letter is analyzed to determine whether to reallocate the distribution of substrings for that letter. If, during the analysis, the number of bins allocated for the substrings within a letter is either greater than or less than the number of bins allocated to that letter in step 312, the bins must be reallocated according to the sort described in association with step 318. The sort is conducted to identify the substring(s) that have the least population percentage of those substrings that have been allocated to at least one bin. Then, the sort conducts a series of calculations for each substring in which one bin is subtracted from the number of bins allocated for each substring. If, after these calculations, the result is zero bins for a particular substring, the substring having zero bins is absorbed into a neighboring substring by the same process as discussed above.

As described in step 328, the bins are configured to create a representation 30 of the segmentation. Each bin is assigned an alphabetical designation having any one of the above-described alphabetical designations. Further, each bin is assigned a bin count, as described above, and a bin number which is associated with the alphabetical designation, as described above. During the configuration of the alphabetical designations for the segmentation of the bins, the range of either single letters or two-letter substrings eliminates any gaps that may exist in the customer name pool.

Finally, as stated in step 330, the representation 30 of the segmented configuration of bins is sent as an output 31 to be viewed by the user. The output 31 may be displayed on a display monitor or any other means of displaying or showing the representation 30 of bins 12 to the user. As discussed, if the representation 30 contains more than one page of information the user can flip through the pages of the representation 30. Further, after the configuration has been determined, the user may print the representation 30, the pharmacy prescription label 100 or the bin labels 212.

To resegment the bins 12, the user must input a new bin quantity. Each time a new input of bin quantity is entered into the system 10, the controller 20 resegments the bins according to the new input and the most recent list of the customers in the database 18 or the selected list of customers as discussed above. After each resegmentation of the bins, it is necessary to relabel or place a new label (see generally, for example, label 100 of FIG. 4) on each prescription container. These new labels include new identification data (see, for example, block 102 of FIG. 4) to prevent a prescription container from being misplaced due to old identification data on the container's first, original label which, after the resegmentation of the bins 12, has become outdated.

Because the bins 12 are resegmented each time a new input of bin quantity is entered into the system 10 which results in the relabeling of bins 12 as well as the prescription containers, it may be desirable to restrict access to the bin management system 10 to certain people such as, pharmacy managers. Accordingly, in an embodiment of the system 10, a password may be required to access the bin management system. Further, in another embodiment of the system, a warning signal may appear to remind the user about the relabeling of the bins and the containers after resegmentation of the bins.

As is known, some prescriptions may be stored at room temperature while other prescriptions must be kept refrigerated. The above-described system 10 is also useful for refrigerated prescriptions. Utilizing the above-described bin management system 10 the refrigerated prescription containers have the same identification data 102 as the prescriptions stored at room temperature. However, in contrast to the method of stocking and retrieving of room temperature prescriptions, the method of stocking and retrieving of the refrigerated prescriptions may be a bit more complicated and, therefore, time consuming for the pharmacist.

For example, a prescription container storing medication which requires refrigeration may be placed in a refrigerated unit with a label having bin identification data. Then, an empty container or bag, also having a label with the same bin identification data as the container in the refrigerated unit, is placed in the identified bin. When a customer arrives to pick up the refrigerated prescription, the pharmacist goes first to the identified bin, retrieves the empty container and then goes to the refrigerated unit to retrieve the actual prescription. Hence, because of the extra steps of stocking and retrieving the empty prescription container, the method of stocking and retrieving refrigerated prescriptions may be a bit more complicated and time consuming for the pharmacist.

Alternatively, the bin management system 10 could include a refrigeration identifier that would be listed with the other identification data 102. The refrigeration identifier could signal to the pharmacist that the prescription is in a refrigeration unit and is not stored in the bins. This refrigeration identifier would be useful to the pharmacist because it could eliminate the steps of stocking and retrieving an empty container from the bins.

While the above-described system and method for bin management have been described specifically in association with the filling, stocking, storing and retrieval of prescription containers for customers at a specific location, the system and method for bin management additionally may be used in association with other personalized, customer-specific services performed by the specific location. Other personalized, customer-specific services may include services related to processed films and photographs, dry cleaning, groceries and movie rentals.

The present disclosure has been described in terms of several preferred embodiments and examples, each of which are intended to illustrate the principles of the present disclosure. One of ordinary skill in the art will appreciate that disclosure may be otherwise embodied without departing from the scope and spirit of the disclosure set forth in the appended claims.

What is claimed is:

1. A system for bin management comprising:
   an input of bin quantity;
   a database of customer-specific data;
   a controller operatively connected to the database, the controller arranged to receive the customer-specific data and the input of bin quantity, to use the customer-specific data and the input of bin quantity to determine a segmentation of a multiplicity of bins, and to create a representation identifying the segmentation of the multiplicity of bins, the controller having a memory for storing the representation; and
   an output of the representation identifying the segmentation of the multiplicity of bins.

2. The system of claim 1 further comprising a user interface operatively connected to the controller, the user interface enabling a user to enter the input of bin quantity.

3. The system of claim 1 further comprising a display operatively connected to the controller, the display enabling a user to view the output.

4. The system of claim 1 further comprising a printer operatively connected to the controller, the printer arranged to print the output.

5. The system of claim 1 wherein the customer-specific data is location-specific data and includes a plurality of names associated with the location-specific data.

6. The system of claim 5 wherein the location-specific data is for at least one selected store location.

7. The system of claim 5 wherein the location-specific data is for a selected geographical region.

8. The system of claim 5 wherein the customer-specific data includes at least one activity update for each name, the activity update representing customer activity for a selected name within a selected time frame.

9. The system of claim 8 further comprising a user interface operatively connected to the controller, the user interface enabling the user to enter the selected customer, the selected location and the selected time frame.

10. The system of claim 8 wherein the selected time frame is six months.

11. The system of claim 8 wherein the selected time frame is one year.

12. The system of claim 1 wherein the representation is alphanumeric.

13. The system of claim 12 wherein the representation includes a plurality of bin counts, a plurality of alphabetical designations associated with the customer-specific data and a plurality of bin numbers associated with each alphabetical designation.

14. The system of claim 13 wherein an alphabetic designation of the plurality of alphabetic designations comprises a range of letters in alphabetical order.

15. The system of claim 13 wherein an alphabetic designation of the plurality of alphabetic designations comprises at least one letter.

16. The system of claim 13 further comprising:
a peel-off label removably disposed on a backing surface; and
a printer operatively connected to the controller, the printer arranged to print on the peel-off label; wherein the controller is arranged to forward customer-specific data for a selected customer to the printer to thereby cause the printer to print customer-specific data for the selected customer including the alphabetical designation associated with the selected customer of the customer-specific data and the bin number associated with the selected customer of the customer-specific data on the peel-off label.

17. A method of bin management comprising:
entering an input of bin quantity;
calculating a segmentation of a multiplicity of bins based on a database of customer-specific data and the input of bin quantity;
creating a representation of the segmentation of the multiplicity of bins; and
displaying the representation of the segmentation of the multiplicity of bins.

18. The method of claim 17 further comprising storing the representation of the segmentation of the multiplicity of bins in a memory device.

19. The method of claim 17 further comprising printing the representation of the segmentation of the multiplicity of bins.

20. A method of bin management comprising:
providing a database, the database including customer-specific data for a plurality of customers;
providing segmentation data for a multiplicity of bins, the segmentation data associated with the customer-specific data in the database;
selecting a customer from the database;
matching the segmentation data with the customer-specific data of the selected customer to identify a bin of the multiplicity of bins for storing an item for the selected customer;
printing bin identification data associated with the identified bin for the selected customer;
labeling the item with the printed identification data; and
storing the item in the identified bin of the multiplicity of bins according to the identification data printed for the selected customer.

21. The method of claim 20 further comprising the step:
retrieving the item from the identified bin based on the bin identification data printed for the selected customer.

22. The method of claim 20 further comprising a peel-off label, wherein the identification data is printed on the peel-off label.

23. The method of claim 22 wherein the peel-off label is removably disposed on a sheet.

24. The method of claim 22 further comprising the step:
providing a printer, wherein the printer includes an input arranged to receive the peel-off label and the printer is further arranged to print on the peel-off label.

25. The method of claim 20 wherein the segmentation data includes a plurality of bin counts, a plurality of alphabetical designations associated with the customer-specific data in the database and a plurality of bin numbers associated with the plurality of alphabetical designations.

26. The method of claim 25 wherein the alphabetical designation represents at least one letter of a name of the selected customer.

27. The method of claim 20 wherein the bin identification data comprises a bin number and an alphabetical designation for the selected customer and the item is stored according to the bin number.

28. The method of claim 27 further comprising the step:
retrieving the item based on the bin number for the selected customer.

29. The method of claim 20 wherein the bin identification data comprises a bin number and an alphabetical designation for the selected customer and the item is stored according to the alphabetical designation.

30. The method of claim 29 further comprising the step:
retrieving the item based on the alphabetical designation for the selected customer.

* * * * *